United States Patent [19]

Wall et al.

[11] 4,246,322

[45] Jan. 20, 1981

[54] PLATINUM ALLOY JEWELLERY WIRE

[75] Inventors: John E. Wall, Uxbridge; Ernest E. Lloyd, London, both of England

[73] Assignee: Johnson, Matthey & Co., Limited, London, England

[21] Appl. No.: 10,546

[22] Filed: Feb. 8, 1979

[30] Foreign Application Priority Data

Feb. 15, 1978 [GB] United Kingdom ............... 5992/78

[51] Int. Cl.³ ............................................. B32B 15/02
[52] U.S. Cl. .................................. 428/670; 428/669; 428/674; 428/614
[58] Field of Search ................ 428/670, 674, 614, 669

[56] References Cited

U.S. PATENT DOCUMENTS 3,776,776  12/1973  Petrou ................................ 428/670
3,905,828  9/1975  Barber ................................ 428/670

*Primary Examiner*—L. Dewayne Rutledge
*Assistant Examiner*—W. G. Saba
*Attorney, Agent, or Firm*—Cushman, Darby & Cushman

[57] ABSTRACT

This invention relates to fabricating wire and particularly wire at least the surface of which consists of platinum or a platinum-based alloy for use in the jewellery industry. The wire according to the invention comprises a first portion at least the outer surface of which consists essentially of platinum or a platinum-based alloy and a second portion in the form of a coating or layer on the outer surface of the first portion, the second portion consisting essentially of a metal or alloy which is soft relative to the platinum or platinum-based alloy. Preferably, the second portion consists essentially of copper.

6 Claims, No Drawings

PLATINUM ALLOY JEWELLERY WIRE

This invention relates to an improved form of fabricating wire, in particular wire at least the surface of which consists essentially of platinum or a platinum-based alloy and used in the jewellery industry, for example, for making chain suitable for supporting pendants, necklaces and the like.

Platinum and platinum-based alloys are becoming increasingly popular as materials for jewellery manufacture but a well-known disadvantage associated with the use of such materials is that they tend to cause an abnormally high and unexplained rate of wear on the cutting or other working edges or surfaces of fabricating tools such as croppers, mandrels and so on.

Wire for use in the manufacture of platinum or platinum-based jewellery, for example, for fabricating chain for use with platinum jewellery, may consist essentially of platinum or an alloy of platinum with, say, 5% of palladium, copper, cobalt or iridium, but typically consists of a coating or outer skin of essentially pure platinum surrounding a solder core. The wire is generally fabricated into chain on a machine which firstly forms the wire into a helix, secondly crops and holds successive individual open coils of the helix, thirdly links two or more, as required for the desired pattern of chain, coils together and finally brings together the ends of each coil defining the opening therein to form a succession of closed links. The chain is then ready for soldering which, in the case of a chain formed from solder-cored wire, may readily be effected by passing the chain through a furnace maintained at a suitable soldering temperature. Whilst machines of the type described give many hours of service when fabricating, say, brass or a silver, or a gold-based alloy chain, the working and , particularly, cutting edges and surfaces deteriorate extremely rapidly when used with wire containing, at least as a surface layer, platinum or a platinum-based alloy.

We have now found that this problem is substantially eliminated if the wire contains, as an outer skin or layer, a coating of soft metal, for example copper or silver.

According to the invention, therefore, we provide wire suitable for use in the manufacture of platinum or platinum-based jewellery and comprising a first portion at least the outer surface of which consists essentially of platinum or a platinum-base alloy and a second portion in the form of a coating or layer on the outer surface of the first portion, the second portion consisting essentially of metal or alloy which is soft relative to the platinum or platinum-base alloy.

The coating or layer may be of silver or silver-alloy but preferably, for reasons of cost, ease of application and so on, it consists essentially of copper.

The coating or layer preferably should not be less than about $\frac{1}{3}$ thou inch thick and need not be more than 1 thou inch thick.

The first portion may, according to the invention, comprise either a solid portion consisting essentially of platinum or a platinum-based alloy or it may comprise a tubular portion consisting essentially of platinum or a platinum-based alloy surrounding and in contact with a core section comprising solder. A typical platinum-based alloy consists essentially of platinum with, say, 5% by weight of one or more of palladium, copper, cobalt and iridium.

It is a feature of the invention that, after the wire has been fabricated into a chain or other article, the copper or other soft metal coating or layer is readily removable, for example in an acid medium, desirably one formulated not to attack any solder core section in the first portion.

Platinum or platinum-based wire may most conveniently be coated with a layer of soft metal by electroplating or chemical plating. For example, and in order to coat a wire with a layer of copper, the wire may be passed through an electrolyte comprising a cyanide salt, for example a Rochelle salt bath containing "Canning Cupranax 2989" plating salt ($80gl^{-1}$), sodium potassium tartrate ($50gl^{-1}$) and water, at 64° C. The wire is initially etched by reversing polarity—that is, by rendering it positively charged—and passing a current of 40 amps at 3 volts for 10 minutes, before restoring the polarity to render the wire cathodic and passing a current of 20 amps at 2 volts for 20 minutes. This will typically plate a layer of copper onto the wire, the layer having a thickness of about $\frac{1}{2}$ thou inch or 12–13$\mu$. We have found that layers thinner than this, say 3–4$\mu$, tend to flake off. The plated wire is then washed leaving the coating of copper in a dull, or matt, state due to surface nodules creating roughness. When making fine chain these nodules tend to cause clogging in a chain-making machine, such as of the type described, so it is desirable to remove them and this may simply and conveniently be carried out by drawing the plated wire through a die to reduce the overall diameter by about $\frac{1}{2}$ thou inch and produce a smooth finish. As an alternative to this procedure, the platinum or platinum-based wire can be plated from a bright plating bath, thus avoiding the need to draw down to a smooth finish.

The copper coating can readily be removed from the wire after fabrication into chain by, for example, immersion in 75% nitric acid for about 20 seconds.

We have found, using wire according to the invention, for example, fabricating into jewellery chain, that the working and cutting edges and surfaces of a chain-making machine of the type described have a useful service life comparable with the expected life when using wire other than of platinum or a platinum-base alloy. Furthermore, since, after removing or stripping the soft metal coating or layer, the material of the chain is substantially the same as before the soft metal coating was applied, there is no problem in assay tests, hallmarking and the like of the chain itself or of jewellery articles associated with the chain.

What we claim is:

1. A platinum or platinum alloy wire which can be fabricated into platinum-based jewellery with reduced wear on working or cutting surfaces of jewellery fabricating apparatus, said wire consisting of a platinum or platinum alloy core or a solder-cored platinum or platinum alloy, having a thin outer coating of soft metal to protect said surfaces from the wear which would otherwise be encountered in fabricating the wire into jewellery, said coating being removable after the wire is fabricated into jewellery to leave jewellery having a platinum or platinum-based outer surface.

2. Wire as claimed in claim 1 in which the soft metal coating consists essentially of copper.

3. Wire as claimed in claim 2 in which the coating is from about $\frac{1}{3}$ thou inch to 1 thou inch in thickness.

4. Wire as claimed in claim 2 in which the coating is about $\frac{1}{2}$ thou inch thick.

5. Wire as claimed in claim 1 in which the coating has been produced by plating with subsequent drawing of the plated wire to produce a smooth finish.

6. Wire as claimed in claim 1 in which the coating has been produced by bright plating.

* * * * *